United States Patent [19]
Ericksen et al.

[11] Patent Number: 5,479,338
[45] Date of Patent: Dec. 26, 1995

[54] PROGRAMMABLE CONTROLLER APPARATUS FOR IRRIGATION SYSTEMS

[75] Inventors: Kent C. Ericksen, Centerville; Kim Hayes, Salt Lake City, both of Utah

[73] Assignee: Pro-Mark, Inc., Bountiful, Utah

[21] Appl. No.: 183,170

[22] Filed: Jan. 18, 1994

[51] Int. Cl.⁶ .................................................. G06F 19/00
[52] U.S. Cl. ........................ 364/145; 137/624.2; 239/69; 364/420
[58] Field of Search ................................. 364/145, 143, 364/144, 146, 188, 189, 420, 509, 510; 239/63, 67–70; 137/624.11–624.2

[56] References Cited

U.S. PATENT DOCUMENTS

| | | | |
|---|---|---|---|
| 2,821,434 | 1/1958 | Hunter et al. | 229/25 |
| 3,951,339 | 4/1976 | DuFresne | 239/66 |
| 4,165,532 | 8/1979 | Kendall et al. | 364/420 |
| 4,244,022 | 1/1981 | Kendall | 364/420 |
| 4,569,020 | 2/1986 | Snoddy et al. | 364/420 |
| 4,639,881 | 1/1987 | Zingher | 364/188 X |
| 4,703,412 | 10/1987 | Cunningham et al. | 364/140 |
| 4,760,547 | 7/1988 | Duxbury | 364/420 |
| 4,791,948 | 12/1988 | Bayat | 137/1 |
| 4,799,142 | 1/1989 | Waltzer et al. | 364/143 |
| 4,827,155 | 5/1989 | Firebaugh | 307/141.4 |
| 4,937,732 | 6/1990 | Brundisini | 364/145 |
| 4,962,522 | 10/1990 | Marian | 379/5 |
| 5,074,468 | 12/1991 | Yamamoto et al. | 234/69 |
| 5,154,349 | 10/1992 | Vaughn | 239/69 |
| 5,262,936 | 11/1993 | Faris et al. | 364/140 |
| 5,272,620 | 12/1993 | Mock et al. | 364/145 |

OTHER PUBLICATIONS

Hardie Irrigation, *Rain Dial Electric Controller*, Sep., 1991 (U.S.A.).
Hardie Irrigation, *Total Control Hybrid Controllers*, Mar., 1992 (U.S.A.).

Primary Examiner—Joseph Ruggiero
Attorney, Agent, or Firm—Berne S. Broadbent; Gary D. E. Pierce

[57] ABSTRACT

A programmable controller apparatus and method for irrigation systems including at least one removable control module interfacing with internal circuitry of the programmable controller for activating and operating a plurality of watering valves. A housing unit is provided for the control module and the internal control circuitry of the programmable controller to prevent water contamination and unauthorized tampering. The removable control module interfaces with the internal circuitry of the controller to provide variations in programmable watering sequences for individual watering stations. The control module, in addition, comprises multiple programming keys and switches that provide interaction between the electronic programming and manual programming features which function in combination to provide easier programming options for the irrigation controller. Moreover, the stand alone capacity of the removable control module allows the control module to be programmed at a remote location from the irrigation controller. A manual mode of operation is provided for selectively overriding or deactivating previously entered programming sequences for individual watering stations without disturbing the programming sequences of other watering stations. A master valve is also included which can be selectively activated on a programmable basis for individual watering stations. Formed on the exterior of the housing unit of the programmable controller is an external default indicator that provides visual indication of faulty watering stations. Further thereto, a transmitter/receiver provides the programmable controller with radio compatible for on-site programming of faulty watering stations of the irrigation system.

16 Claims, 6 Drawing Sheets

PROGRAMMABLE CONTROLLER APPARATUS FOR IRRIGATION SYSTEMS

BACKGROUND

1. The Field of the Invention

This invention relates to solid state irrigation controllers which automatically regulate a plurality of watering stations or zones, and more particularly, to a novel programmable controller apparatus and method for irrigation systems which is capable of providing an efficient and more manageable means for programming a control module, an independent programmable pump start for each watering station, and novel means for supplementing an irrigation system with additional watering zones or stations.

2. The Background Art

Normally, vegetation and greenery grows in soil watered by rain. Where rain is so seasonal that the quantity of rainfall fails to meet the requirements of particular types of vegetation, or when the amount of rainfall is deficient or practically nonexistent, the extreme drying of the soil may retard, and eventually prevent, vegetation growth. Irrigation can compensate for the vicissitudes of nature by supplying water directly to areas of vegetation and greenery in regular intervals and in sufficient volumes.

Earlier techniques and methods of irrigation which were utilized to provide supplemental watering to vegetation and greenery located remote distances from a water source, traditionally included, for example, such methods as supplying water manually by hand and bucket directly to the vegetation, or by such means as constructing simple aqueduct systems. Aqueduct systems of the prior art were generally constructed by forming long furrows or canals immediately alongside the vegetation or greenery to provide moisture and promote vegetation growth and productivity. Over time, various other types of irrigation techniques and devices were developed by those skilled in the art to simplify and supplement traditional methods of irrigation. For example, simple mechanical lifting aids and animal-powered irrigation devices were developed to assist users in transporting water from a water source to a localized area of vegetation requiring supplemental irrigation.

As technology progressed with the advent of steam power, the internal combustion engine and electricity, irrigation systems became fully mechanized operations in many parts of the world. Many of the earlier traditional techniques and methods of providing irrigation were replaced by mechanical devices with internal programmable timer units. Moreover, mechanical irrigation devices of the prior art revolutionized the irrigation industry by providing a novel means for automating the control of water flow from a pressurized water source through such means, as for example, portable, lightweight aluminum piping, to numerous watering stations located remote distances from the water source.

Traditionally, automatic electromechanical controllers of the prior art incorporate multiple conventional motor-driven electric clocks which provide a mechanized means for programming individual start times for various irrigation cycles and watering stations. Calendar programs are generally incorporated to provide a means for selecting particular days of operational watering which normally includes a period over 14 days. Typically, calendar programs used in conjunction with prior art electromechanical controllers are functionally realized through the use of a disc being mechanically rotated to a next day position by a conventional motor-driven clock, once every 24 hours.

Employed in all but the simplest versions of electromechanical irrigation controllers of the prior art, cycle start circuits are typically provided to activate additional timer motors for advancing the irrigation controller through multiple preset watering cycles. Pins are generally placed in clock dials to close a switch at a preset time and, if the circuit is completed through a switch held closed by the calendar wheel pin on a day designated for irrigation, the watering cycle typically starts. In this regard, cycling water from station to station and programming watering intervals and timing durations for individual watering stations or zones may be accomplished by the placement and specific arrangement of various functional pins, cams, levers and other mechanical devices of prior art electromechanical controllers which interact with one another in concert to provide preprogramming automation for an irrigation system.

Increasing the number of watering zones or stations of prior art automatic electromechanical irrigation controllers to expand the watering capabilities of the irrigation system and provide water to larger areas of vegetation or greenery, such as golf courses, cemeteries, or parks, typically involves a significant number of mechanical disadvantages in the overall performance of the irrigation system. Moreover, in expansion of the watering capabilities of an irrigation system employing automatic electromechanical controllers of the prior art generally requires a dramatic increase in the number of working parts to realize and effectuate the additional programming capabilities typically required when increasing the number of watering stations or zones of an initial irrigation system.

In response to the problems associated with the dramatic increase in mechanical working parts required by prior art electromechanical irrigation controllers when expanding the watering capabilities of an irrigation system, those skilled in the art developed automatic solid state irrigation controllers which eliminated electric motors, mechanical switches, actuating pins, cams, levers, gears and other mechanical devices typically associated with electromechanical controllers and replaced them with solid state electronic circuitry. The programming potential of automatic solid state controllers of the prior art generally permits the user to program, for example, multiple start times and day programs for individual watering stations, repeat cycles, watering time selections in minutes (sometimes seconds), while maintaining the split-second accuracy of solid state timing without requiring the numerous interacting mechanical parts employed by prior art electromechanical irrigation controllers.

Automatic solid state irrigation controllers of the prior art typically provide a user with several program sequences from which to select. Generally, the user has the option to choose from multiple program sequences offered by the controller and determine the specific program options which best accommodate the particular watering needs of the user's vegetation and greenery in a most advantageous manner. In this regard, each of the various program sequences typically has its own independent start times which generally include several start times per day.

To accommodate and sustain multiple program sequences, solid state irrigation controllers of the prior art generally incorporate a programmable microprocessor-controlled user interface that provides a user with the capability of programming several sprinkling stations or zones in a variety of timing scenarios, for example, daily, weekly, odd days, even days, etc. Each watering station or zone usually includes one or more sprinklers and a solenoid valve which is generally regulated by the microprocessor unit. Solenoid valves typically control the flow of water entering a particular watering station from a pressurized water source, and provide a means for monitoring the flow of water exiting the watering station through various sprinkler lines that typically terminate into a plurality of sprinkler heads strategically located throughout an irrigation area.

Microprocessor units of prior art automatic solid state irrigation systems are generally programmable by user interface and provide the user with a means for manually entering input commands and data into designed program sequences which may then be selected to regulate any particular watering zone or station. To assist the user of the solid state irrigation controller when programming the microprocessor unit, Liquid Crystal Displays (LCD) are generally provided to visually communicate feedback to the user describing the current status of the programmable data being entered into the control module of the irrigation system by the user.

Other general features of automatic solid state irrigation controllers of the prior art may include manual modes of operation which generally function to provide the user with an option of overriding all preprogrammed automatic watering operations of an irrigation controller. For example, manual operational modes of prior art solid state irrigation controllers may be utilized when excessive amounts of rain have fallen, or when a lengthy spell of dry weather has occurred requiring greater quantities of irrigation than previously programmed by the user to sustain vegetation growth and productivity.

There are significant disadvantages, however, associated with the use of manual operational modes incorporated by solid state irrigation controllers of the prior art. For example, manual modes of operation generally fail to provide a means for overriding program sequences on a selective basis, such as between individual watering stations or zones of an irrigation system. In this regard, either all watering stations or zones of an irrigation system are operated according to established preprogrammed watering sequences, or all the watering stations or zones of the irrigation system are controlled by a manual operational mode. Since watering intervals and irrigation amounts are typically dependent upon the type of vegetation or greenery, serious disadvantages may result when operational limitations of an irrigation system are consistently manipulated by manual operational modes without regard to the specific watering needs of particular vegetation.

Automatic solid state controllers of the prior art generally include a back-up power source providing the controller with a means for storing previously entered program designations if a power outage occurs. Solid state irrigation controllers of the prior art may also incorporate fault indicators which typically provide a means for alerting the user of a faulty watering station or stations. When a fault indicator is activated, the internal programming circuitry of prior art solid state irrigation controllers generally bypass the preprogrammed operational commands of the faulty station, thereby restricting any further preprogrammed watering commands to the solenoid of the faulty station.

A meaningful disadvantage with fault indicators of prior art solid state irrigation controllers involves those problems associated with the user failing to receive some form of recognizable notice that a watering station has been designated as being faulty. In this regard, to adequately monitor the irrigation system for faulty stations, the user is generally faced with one of two alternatives. First, the user could watch the systematic watering of all the watering stations or zones to assure himself that watering was occurring at each watering station for the programmed intervals, or the user could personally inspect the LCD display of the irrigation controller on a daily basis to investigate for any visual indications that faulty stations exist. Typically, users of solid state irrigation systems do not take the time to personally inspect the control unit of the irrigation system on a daily basis, or to sit and watch a complete watering cycle to insure proper watering is taking place at each and every watering station or zone. Unfortunately, users of solid state irrigation controllers generally do not recognize that a watering station or zone has been designated as "faulty" until such time as the vegetation or greenery begins to yellow or turns brown due to the lack of sufficient irrigation.

Prior art irrigation controllers may be constructed to include a master valve which provides a means for controlling the flow of water from a designated water source. Master valves of prior art solid state irrigation controllers generally activate a water pump to provide supplemental watering to an irrigation area. Typically, water pumps of prior art irrigation systems comprise a filtration system to restrict debris from corrupting the irrigation flow systems.

A serious disadvantage with master valves of prior art solid state controllers is that when a master valve activates a water pump, the water pump typically remains activated until all programming sequences of each watering station and zone of the irrigation system has cycled at least once. In this regard, master valves of the prior art are incapable of being independently controlled or activated for individual watering stations or zones. Rather, the master valve either activates a water pump for all watering stations, or the water pump remains inactive for the duration of a complete irrigation cycle.

When a second water pump is added to an irrigation system to extract water from a secondary water source, master valves of prior art solid state irrigation controllers will typically activate both water pumps for the duration of all programming sequences of every watering station or zone, whether or not the pump is actively withdrawing water. Moreover, the constant activation of the water pump through the entire watering cycle of an irrigation system without the pump actually facilitating the extraction of water, may result in serious mechanical impediments to the water pump and filtration system, thus restricting the overall efficiency and effectiveness of the irrigation system.

Another significant disadvantage with automatic solid state irrigation controllers of the prior art is that they tend to conventionally require numerous detailed and unreasonably complicated steps to satisfactorily program the microprocessor unit of the controller. Similarly, the user is generally constrained to observe numerous lengthy and tedious programming steps when inputting individualized programming sequences for individual watering stations or zones of the irrigation system. Moreover, when a user desires to make any minor modifications to a particular programming sequence of a certain watering station or zone, the user is generally required to reprogram and reenter new program schedules for every other watering station. Further thereto, reprogramming microprocessor units of prior art solid state irrigation controllers generally involves a large investment of time, typically requiring the user to maintain a certain amount of programming literacy and expertise to avoid the numerous confusingly similar programming steps.

When programming the microprocessor unit of prior art solid state irrigation controllers or making minor modifications to program sequences of individual watering stations or zones, the user must generally be in physical contact with the control module to enter the new program commands. Automatic irrigation controllers of the prior art, however, are generally mounted outside. And, since all programming capabilities of the controller are typically entered at the physical location of the microprocessor control unit, inputting programming data outdoors may result in a significant inconvenience to the user, especially during inclement weather.

When servicing prior art automatic solid state irrigation controllers, the user typically turns on the faulty watering station at the physical location of the programmable controller and walks to the specific location of the related watering station or zone for the purpose of visually observing the operation or non-operation of the faulty station when the station is activated. After examining the activity or inactivity of the particular faulty watering station, the user generally returns to the programmable controller and deactivates the faulty watering station using the overriding manual mode of operation.

In other circumstances, maintenance and service of faulty watering stations or zones of an irrigation system may involve the employment of at least two service operators. One service operator usually remains at the physical location of the programmable controller, while the other service operator ventures to the areas where the faulty watering stations are supposed to provide supplemental irrigation. While checking the irrigation system, both service operators generally communicate with one another as to the working status of the faulty watering stations when the station is manually activated. In this regard, maintaining and servicing prior art solid state irrigation controllers can quickly amount to a lot of wasted time and effort incurred with the excessive walking of a user between the programming controller and faulty watering stations, or with the requirement that at least two service attendants are typically needed to facilitate repairs and proper maintenance to an irrigation system.

In addition to the foregoing disadvantages, expanding the watering capabilities of prior art solid state irrigation controllers to provide water to larger areas of vegetation or greenery, such as, golf courses, parks, cemeteries, etc. generally involves great expense and inconvenience with regard to programming operations. Moreover, if the user wants to provide supplemental irrigation to an area larger than the current irrigation system can facilitate, the user is typically required to establish separate programming routines for an additional and completely independent irrigation controller having its own housing unit and internal circuitry to operate the additional watering stations or zones.

BRIEF SUMMARY AND OBJECTS OF THE INVENTION

In view of the foregoing, it is a primary object of the present invention to provide a programmable controller apparatus and method for irrigation systems which provides a manual mode of operation for selectively overriding the programming sequences of designated watering stations or zones without directly influencing the preprogramming sequences of other individual watering stations of the irrigation system.

It is also an object of the present invention to provide a programmable controller apparatus and method for irrigation systems which incorporates an external warning device for alerting a user that one or more watering stations or zones have been designated as faulty.

It is a further object of the present invention to provide a programmable controller apparatus and method for irrigation systems which provides a master valve that is programmable by watering station or zone, and which allows the user the ability to program the master valve to activate a water pump and filtration system when an individual watering station is enabled.

It is a still further object of the present invention to provide a programmable controller apparatus and method for irrigation systems which provides a novel combination of electronic programming which interacts with manual programming features to provide greater ease and flexibility in programming the irrigation controller, or when making minor performance modifications to preprogrammed sequences of the watering stations or zones.

It is an additional object of the present invention to provide a programmable controller apparatus and method for irrigation systems which utilizes a removable control module that provides the user with the capability of programming the control module at some remote location from the physical location of the controller.

Likewise, it is an object of the present invention to provide a programmable controller apparatus and method for irrigation systems which is radio compatible to provide on-site programming when servicing faulty watering stations or zones.

In addition thereto, it is an object of the present invention to provide a programmable controller apparatus and method for irrigation systems which comprises a novel means for easily expanding the watering capacity of an irrigation system by inserting a control module with greater watering capability without having to incorporate more than one programmable controller or separate programming routines.

Consistent with the foregoing objects, and in accordance with the invention as embodied and broadly described herein, a programmable controller apparatus for irrigation systems is disclosed in one preferred embodiment of the present invention as including at least one removable control module which interfaces with internal circuitry of the programmable controller for activating and operating a plurality of watering valves. A housing unit is provided for the removable control module and the internal control circuitry of the programmable controller to prevent water contamination and unauthorized tampering. The removable control module interfaces with internal circuitry of the programmable controller to provide variations in programmable watering sequences for individual watering stations. The removable control module comprises multiple programming keys and switches that provide interaction between electronic programming and manual programming features which function in combination to provide easier programming options for the irrigation controller. The stand alone capacity of the removable control module allows the control module to be programmed at a remote location from the irrigation controller. An LCD display and the functional programming keys and switches of the control module provide a means for programming various watering sequences into the memory of the removable control module for activating watering stations at preprogrammed times. A manual mode of operation is provided for selectively overriding or deactivating previously entered programming sequences for individual watering stations without disturbing the programming sequences of other watering stations. A master valve is also included which can be selectively activated on a programmable basis for individual watering stations. Formed on the exterior of the housing unit of the programmable controller is an external warning indicator that provides visual indication of faulty watering stations. A transmitter/receiver provides the programmable controller with radio compatible for on-site programming of faulty watering stations of the irrigation system.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 6, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
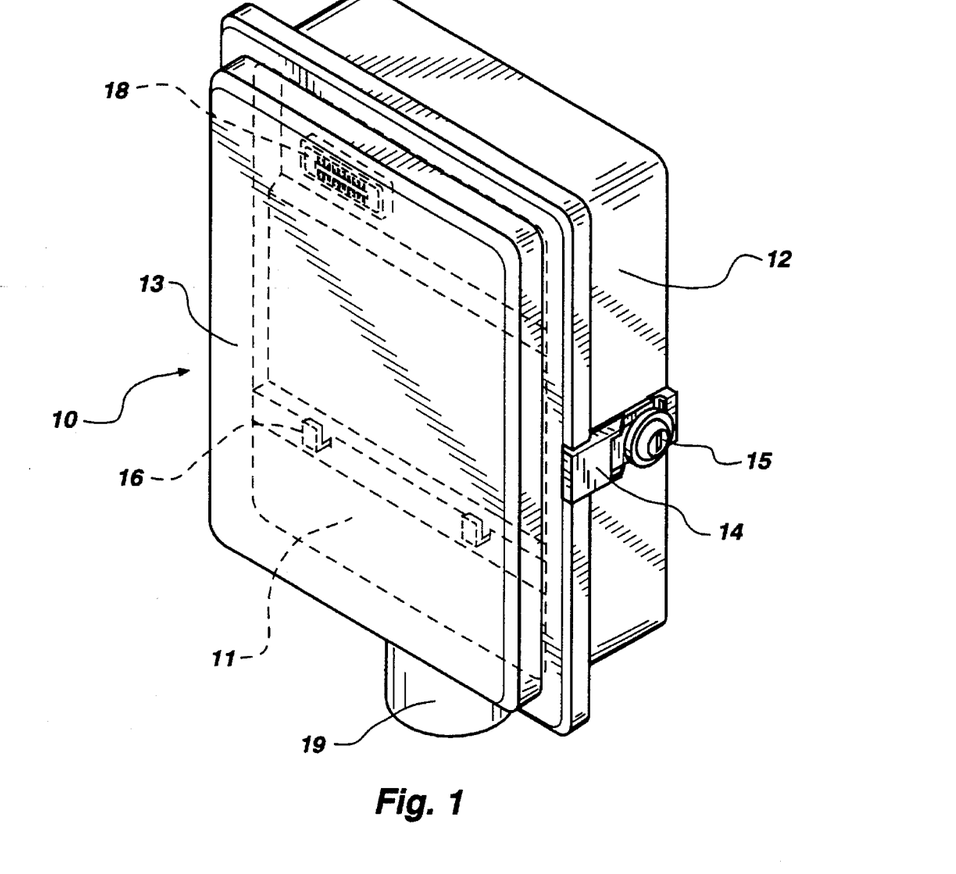
FIG. 1 is a perspective view of a programmable controller apparatus for irrigation systems illustrating one presently preferred embodiment of the housing unit of the present invention.

One presently preferred embodiment of the programmable controller apparatus of the present invention, designated generally at 10, is illustrated in FIG. 1. As shown, programmable controller 10 comprises a substantially rectangular housing unit 12 preferably formed of a rigid plastic material. It will be readily appreciated, however, that housing unit 12 can, of course, be formed from a wide variety of suitable materials and that other shapes or configurations are possible.

Figure 2:
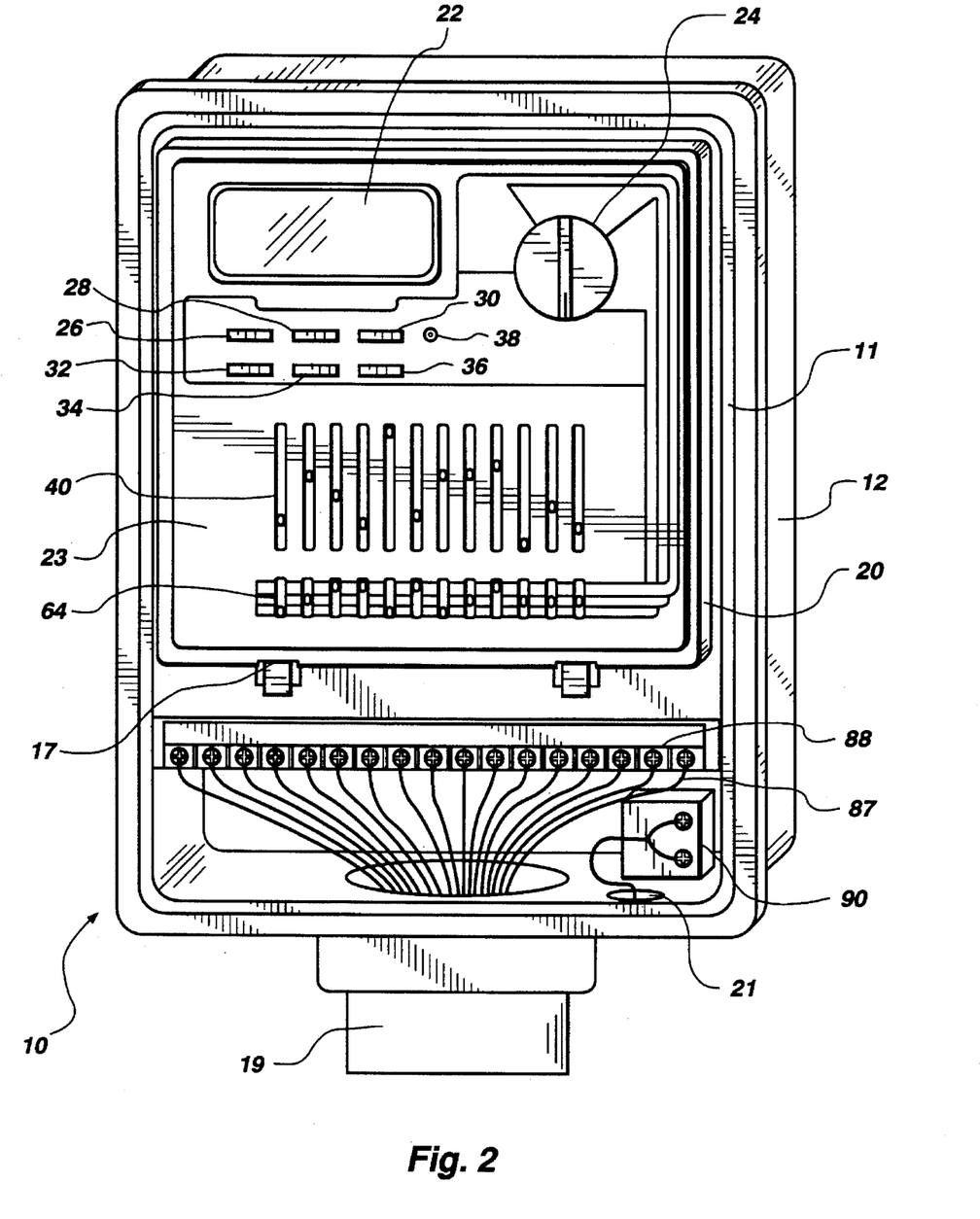
FIG. 2 is a perspective view of one presently preferred embodiment of the removable control module of the programmable controller apparatus of the present invention.

Housing unit 12 is sufficient in size to accommodate a removable control module 20, generally shown in FIG. 2, and internal circuitry of programmable controller 10. A weather-resistant cover 13 may be hingeably attached to housing unit 12 and secured over the external front facing 11 of housing unit 12 by a conventional latch mechanism 14 and locking means 15 to prevent water contamination and unauthorized tampering of control module 20.

Advantageously, the face of control module 20 depicted in FIG. 2 may comprise a replaceable control label template 23 having a readily peelable adhesive backing for application thereto. In this way, a control template 23 can be provided in the native language of each country in which the unit will be used, thereby allowing all of the controls to be readily and selectively identified in virtually any language without modification of the unit as a whole. Preferably, control label template 23 is designed in such a manner so as to provide graphical schematics to assist in programming control module 20. The graphic design of control label template 23 provides multiple color-based programming depictions which provide a general basis for correlating the various operational programming features of control module 20 with each another and facilitate easier programming.

Control module 20 is removably connected to housing unit 12 by means of support tabs 16 rigidly connected to the external front facing 11 of the housing unit 12. Support tabs 16 are inserted into complimentary openings 17 formed at the base of removable control module 20 to retain the control module 20 within housing unit 12, as illustrated in FIG. 2. Preferably, the external front facing 11 of housing unit 12 is formed in such a manner to assist support tabs 16 with retaining control module 20 within housing unit 12, when inserted therein. A complimentary connector card positioned on the backside of removable control module 20 may be inserted into connector 18 which is integrally formed on the external facing 11 of housing unit 12 to provide a means for interfacing removable control module 20 with the internal circuitry of programmable controller 10.

Referring now to FIG. 2, a substantially circular output conduit 19 extends from the base of housing unit 12 providing a general passageway for electrical wiring 87 to be introduced therethrough and operably coupled to a terminal connector strip 88 providing a means for interfacing watering stations or zones of the irrigation system with the internal circuitry of programmable controller 10. An opening 21 which is preferably lined with a weatherproof grommet is formed in the base of the housing unit 12 and provides means for connecting an AC power source to a connector block 90.

As illustrated in FIG. 2, cover 13 of housing unit 12 has been removed to expose removable control module 20 displaying various dome keys and programming switches that function to facilitate the programming of control module 20. The combination of the solid state electronic programming features of a rotary switch 24 and dome keys 26, 28, 30, 32, 34 interacting with manual programming duration slide switches 40 provides greater ease and flexibility when programming the irrigation controller 10. For example, rotary switch 24 provides several functional programming selections for individual watering stations or zones operated by programmable controller 10. These functions include, for example, MASTER VALVE programming, SET TIME/DATE, Schedule "A" start times and watering days, Schedule "B" start times and watering days, and Schedule "C" start times and watering intervals. Rotary switch 24 also has a position to allow the user to set the control module 20 to AUTO mode in which the programmable controller 10 automatically waters each station or zone according to its individualized preprogrammed schedule. In addition, rotary switch 24 includes an OFF position providing an overriding means that inhibits all automatic and manual watering of the programmable controller 10, until such time as rotary switch 24 is removed from the OFF position.

Keys 26, 28, 30, 32, 34 and 36 are preferably push-button dome keys which assist with the setup and entry of various programming functions of rotary switch 24 as described above. A MANUAL key 26 provides extra watering for all stations or for a particular individual watering station for a specific duration of time which will be described in further detail below. A CLEAR key 28 operates to clear the existing setting of the active field during programming and initialize the 24 hour inhibit mode (the mechanics of which will also be described below). A NEXT key 30 scrolls through different programming fields such as start times, watering days, interval, station number, year, month, and day etc.

A "–" key 32 and a "+" key 34 are used to alter time intervals backwards or forwards, respectively, while the user programs time settings. An ENTER key 36 confirms the existing setting of the watering station during the programming procedure. A RESET key 38, such as, for example a pin hole type, provides a means for resetting control module 20 to a default setting. The default setting is preferably date set at "Jan 1993" clock set at 12:00 am, all outputs disabled, and all start times and programs cleared.

Twelve duration slide switches 40 are provided on the front facing of removable control module 20 of the preferred embodiment for programming watering sequences for each of the twelve watering stations or zones provided by the irrigation system. It will be readily appreciated, however, that increasing or decreasing the number of duration slide switches 40 and correlating number of watering stations or zones of the irrigation system is possible.

Duration slide switches 40 provide various selectable watering intervals, including, for example, MANUAL ON, 2 minutes, 5 minutes, 10 minutes, 15 minutes, 20 minutes, 25 minutes, 30 minutes, 45 minutes, 60 minutes, 120 minutes, and MANUAL OFF. The variations in time between watering intervals provided by duration slide switches 40 may be modified without broadening the scope of the present invention.

Watering durations are established for individual watering stations or zones by selectively placing the representative durational slide switch 40 at the desired duration interval. Apart from establishing watering intervals for watering stations of the irrigation system, duration slide switches 40 also provide an overriding manual operational mode for each of the watering stations or zones.

Twelve "3" position programming slide switches 64 are formed on the face of removable control module 20. Programming slide switches 64 provide the user with the capability of selecting from multiple watering schedules, such as, for example, schedules A, B or C, when programming watering start times and watering days for each of the twelve watering stations or zones. By manually adjusting the positioning of programming slide switches 64, the user can easily modify watering start times and watering days for individual watering stations. In this regard, programming slide switches 64 provide flexibility and ease of use when programming watering sequences for individual watering stations of the irrigation system of the present invention.

A Liquid Crystal Display (LCD) 22 is provided on the front facing of removable control module 20 to communicate the entry of programmed information into removable control module 20 and the current programmable status of the controller 10. As more clearly shown in FIG. 3, LCD display 22 preferably includes: (1) four "7" segment digit display 96 indicating year, date, time, duration of automatic watering, and fault indication, (2) one and a half "7" segment digits 98 indicating an active watering station; (3) programming indicators representing schedules A, B, C or default annunciators 100 indicating which selected watering program has been activated for a particular watering station or zone; (4) a Water Drop/WATERING signal 102 indicating the watering status of the irrigation programmable controller 10; (5) an ON indicator signal 104 representing the activated status of the programmable controller 10 as either operating in an automatic watering mode or a manual mode; (6) an OFF indicator signal 106 manually inhibiting a watering station or zone from being electronically activated; (7) fourteen indicator flags 108 signifying a two week (Monday through Sunday period) for use when initiating Schedule A watering commands or programming options; (8) EVERY DAY, 2 DAYS, 3 DAYS, ODD DAYS and EVEN DAYS indicator flags 110 for Schedule B programmable watering sequences; (9) an INTERVAL indicator signal 112 which is activated when programming watering stations or zones according to Schedule C watering commands or programming options; (10) four start time annunciators 114; and (11) a MASTER VALVE indicator signal 116 displaying current master valve programming for a particular watering station or zone. LCD display 22 functions to provide a readable means of communicating the programming status of the control module 20 to the user regarding watering cycles and programming modes of the controller 10. Examples of the foregoing multiple programming capabilities are not intended to be restrictive, but merely representative of one presently preferred embodiment of the present invention. Accordingly, additional watering schedules may be used, such as, for example, a designated watering schedule that provides multiple independent, time-interval watering stations which are activated on a programmable "all days" basis by individual watering station or zone. Another alternate variation in programming capability may include, for example, a programmable watering schedule that accommodates an independent timer control option programmably designated for each individual watering station or zone.

Referring again to FIG. 2, terminal connector strip 88 and connector block 90 are used as electrical connections for wiring extending from a plurality of water valves to the programmable controller 10 to interface therewith. Terminals 88 and 90 are preferably formed of any suitable five terminal block, such as, for example, a zinc alloy type. Terminals 88, 90 preferably include a Remote Terminal for indicating faulty wiring, 3 Common (or Ground) terminals, twelve station or zone terminals connected to solenoids at each watering station, at least one master valve terminal, and two terminal blocks for 110 VAC (or 240 VAC) power connections.

FUNCTIONAL DESCRIPTION

The following provides a functional description of one preferred method for programming one preferred embodiment of removable control module 20 of the present invention. The user enters the current time and date into the memory or microprocessor unit of the control module 20 preferably in such manner, for example, as follows:

1. Turn Rotary Switch 24 to the SET/TIME DATE position;
2. Press '+' 34 or '−' 32 dome keys to set the current time;
3. Press 'NEXT' 30 or 'ENTER' 36 to confirm the time setting and to switch to year setting;
4. Press '+' 34 or '−' 32 dome keys to set the current year;
5. Press 'NEXT' 30 or 'ENTER' 36 to confirm the year setting and to switch to month setting;
6. Press '+' 34 or '−' 32 dome keys to set the current month;
7. Press 'NEXT' 30 or 'ENTER' 36 to confirm the month setting and to switch to date setting;
8. Press '+' 34 or '−' 32 dome keys to set the current day;
9. Press 'NEXT' 30 or 'ENTER' 36 to confirm the date setting; and
10. Alter the Rotary Switch 24 from the SET DATE/TIME position to exit from this programming mode.

Figure 3:
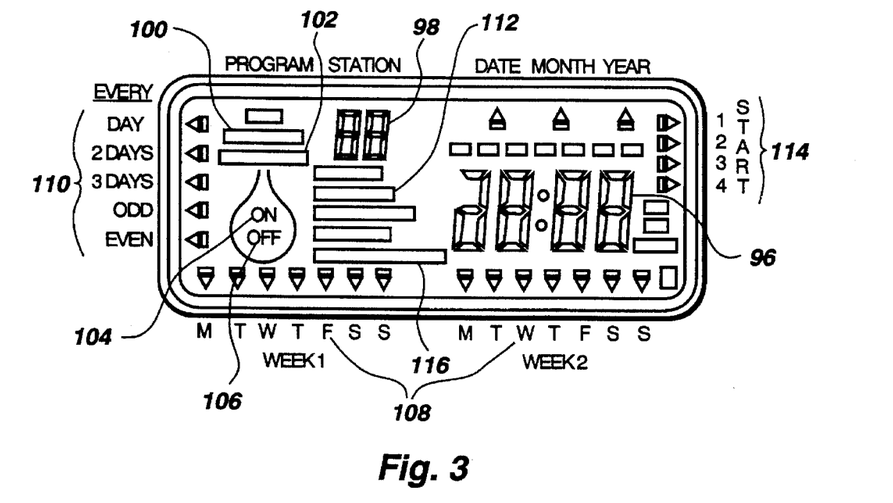
FIG. 3 is a perspective view of one presently preferred embodiment of the LCD display of one presently preferred embodiment of the removable control module of the programmable controller apparatus of the present invention.

Next, the user typically programs the master valve. As discussed above, each individual watering station can be independently programmed to selectively activate a pump start. All watering stations are preferably set to have a pump start by default, whereby to modify the default setting, the following steps, for example, are carried out:

1) Turn Rotary Switch 24 to SET MASTER VALVE position. Station Annunciator 98 reads '1' to indicate the programming of watering station one;
2) Press 'ENTER' 36 to set station one to activate pump start or press 'CLEAR' to disable the optional pump start for station one;
3) Press 'NEXT' 30 to move to watering station two;
4) Repeat steps 2 and 3 until all watering stations are programmed; and
5) Alter the Rotary Switch 24 from the SET MASTER VALVE position to exit from this programming mode.

When watering a station or zone of the irrigation system with the optional pump start, the pump solenoid is enabled at the programmed start time. Watering is generally enabled approximately 5 seconds after the program start time has been initiated.

The user sets the programming schedules for each watering station by selecting either watering schedule A, B or C. If watering Schedule A is selected by the user for a particular watering station, the following steps, for example, would preferably be followed to program controller 10:

1) Turn Rotary Switch 24 to SET WATERING DAYS of Schedule A (the cursor or hyphen over each day segment 108 initially flashes on Monday);
2) Press 'NEXT' 30 to move the cursor through each day segment 108;
3) While the cursor is on the desired day segment 108, press 'ENTER' 36 to select that day for the Schedule A program or 'CLEAR' 28 to cancel that day from the Schedule A program; and
4) Alter the Rotary Switch 24 from the SET WATERING DAYS of Schedule A position to exit from this programming mode.

When using Schedule A for setting watering days and time intervals, the programming options provided by Schedule A include selecting watering on any particular day or days once every week or once every 2 weeks. Schedule A also crosses from Week 1 to Week 2 on Monday at 12:00 am.

If watering Schedule B is selected by the user for a particular watering station, the following steps, for example, would preferably be followed to program controller 10:

1) Turn Rotary Switch 24 to SET WATERING DAYS of Schedule B (the cursor or hyphen at the right of each option flag 110 initially flashes at EVERY DAY);
2) Press 'NEXT' 30 to move the cursor through each option flag 110;
3) While the cursor is on the desired option flag 110, press 'ENTER' 36 to select that option for the Schedule B program or 'CLEAR' 28 to cancel that day from the Schedule B program; and
4) Alter the Rotary Switch 24 from the SET WATERING DAYS of Schedule B position to exit from this programming mode.

Schedule B programmable watering options preferably include: (1) watering every day; (2) watering every 2 days; (3) watering every 3 days; (4) watering on odd calendar days; and (5) watering on even calendar days. The foregoing watering options are indicated by Schedule B option flags 110. Only one programmable watering option, however, may be selected for any particular watering station or zone.

If watering Schedule C is selected by the user for a particular watering station, the following steps, for example, would preferably be followed to program controller 10:

1) Turn Rotary Switch 24 to SET WATERING INTERVAL of Schedule C;
2) Press '+' 34 or '−' 32 dome keys, respectfully, to set the desired watering interval within a 1–28 day range;
3) Press 'ENTER' 36 to confirm the current setting; and
4) Alter the Rotary Switch 24 from the SET WATERING INTERVAL of Schedule C position to exit from this programming mode.

Pursuant to programming Schedule C, every time the watering interval is changed the current day is set to day "0" and watering begins on day one.

Preferably, the next step of the method for programming controller 10 involves the user setting the start times for schedules A, B, and C. The general process for setting start times is identical for each watering schedule and is preferably conducted, as follows:

1) Turn Rotary Switch 24 to SET START TIME of Schedule A, B, or C;
2) The cursor or hyphen to the left of the start time annunciators 114 will flash at the first start time;
3) Press 'NEXT' 30 to cycle through four start time annunciators 114;
4) Press '+' 34 or '−' 32 dome keys, respectfully, to set each start time;
5) Press 'ENTER' 36 to confirm each programmed start time and to advance to the next start time;
6) Repeat Steps 4 and 5 until all start times have been programmed; and
7) Alter the Rotary Switch 24 from the SET START TIME position to exit from this programming mode.

Once the controller has been programmed according to the steps described above, rotary switch 24 is preferably set to the AUTO position to enable automatic watering by programmable controller 10. LCD display 22 displays the current time of day as long as the current time does not match any of the preprogrammed start times. At such time that the current time matches preprogrammed start times for any watering station or zone, programmable controller 10 electronically determines which schedule (Schedule A, B, or C) has been activated by its particular start time. Programmable controller 10 monitors the twelve "3" position programming slide switches 64 to determine which station or stations are to be activated during the selected programming schedule (A, B or C). During an active watering cycle, LCD display 22 oscillates between the current time and the status of the active watering program mode by means of an electronic toggle switch.

LCD display 22 indicates active watering by energizing ON indicator signal 104. The active station number is indicated by the one and a half "7" segment digits 98 and the programming schedule is indicated by active schedule annunciator 100. The amount of time an active station has remaining in its watering sequence is indicated by the four "7" segment digit display 96. Watering stations are watered in sequence from station one to station twelve for the interval of time indicated by their corresponding duration slide switches 40. Once all of the stations running on an active schedule have been watered for their preprogrammed durations, programmable controller 10 waits for the current time to meet the next preprogrammed start time, and then repeats the foregoing process.

Default Program "D" is enabled when all start times for the watering stations are clear, when the watering days for Schedules A and B have not been programmed, or when the watering intervals of Schedule C have not been set. In Default "D" mode, all watering stations are irrigated in relative sequence from station one through station twelve with the watering mode preferably beginning at approximately 5:00 am for a duration of ten minutes at each watering station. LCD display 22 indicates DEFAULT watering by actuating program annunciators 100. Water Drop design 102 and ON indicator signal 104 indicate active watering by the programmable controller 10 of the irrigation system and the four "7" segment digits 96 indicate the duration of watering as represented by the positioning of duration slide switches 40. Any watering station which has its corresponding duration slide switch 40 in the MANUAL ON or MANUAL OFF position will not be watered with default watering.

A manual mode of operational watering can be selected for each individual watering station by placing the respected duration slide switch 40 to the MANUAL ON position. When duration slide switch 40 is placed in the MANUAL ON position, LCD display 22 indicates the status of the watering station by activating ON indicator signal 104 which illustrates an energized watering station. Once the watering station has been activated, manual watering continues for the period of time remaining in the watering interval indicated by the LCD display on the one and a half "7" segment digits 98. If at any time, more than one station is set to MANUAL ON, the station activated last will be served first. When the active station has completed its watering cycle, and more than one station is still set to MANUAL ON, the station with the highest station number will be served first.

An EXTRA WATERING MODE is provided by the programmable controller 10 allowing the user with the selective option of watering all stations once for a specified amount of time. When setting the EXTRAWATERING MODE, the following steps, for example, are preferably followed:

1) Press 'MANUAL' key 26 while in automatic mode;

2) Press 'NEXT' 30 to choose a particular station for extra watering;

3) Set the watering duration for the identified station by its respective duration slide switch 40;

4) Press 'NEXT' 30 to move to the next station;

5) Repeat steps 3 and 4 until the duration of watering for at least two stations has been programmed; and 6) Press 'ENTER' 36 to start the EXTRA WATERING MODE.

LCD display 22 will indicate the status of active watering by energizing ON indicator signal 104. After the EXTRA WATERING CYCLE is completed, programmable controller 10 returns to its normal programming sequence automatic operational mode. If a watering station is already preprogrammed for watering while manual watering is enabled (and no station is set to MANUAL ON), the preprogrammed scheduled is stored and postponed until after the extra watering is complete.

An INHIBIT MODE is provided by the programmable controller 10 which inhibits all automatic preprogrammed watering sequences for a period of 24 hours, except those stations set on MANUAL ON. When programming controller 10 for INHIBIT MODE, the user simply presses CLEAR key 28 during the normal operation of the controller 10. To exit INHIBIT MODE and return to normal preprogramming sequences before the 24 hour inhibited period expires, the user presses ENTER key 36.

When the effective watering of the irrigation system is driven by program start times and watering durations that exceed the next programmed start time, the exceeded start times will be pushed forward until the current watering cycle completes itself. The foregoing modification of start times will preferably be terminated by the first start time of the following day. If a particular station has both extra watering and MANUAL ON enabled, any preprogrammed start times are ignored and fail to initiate.

During normal operation of the programmable controller 10, three triacs may be activated. The triacs/stations are activated by scheduled watering sequences, MANUAL ON, or by pump solenoid activation. The priority levels when more than one mode of operation is selected will be, for example, as follows (from highest to lowest priority): rotary switch 24 OFF position, MANUAL ON/OFF mode of duration slide switches 40, INHIBIT MODE, EXTRA-WATERING MODE, Schedule A program, Schedule B Program, Schedule C program and Schedule D program.

Figure 4:
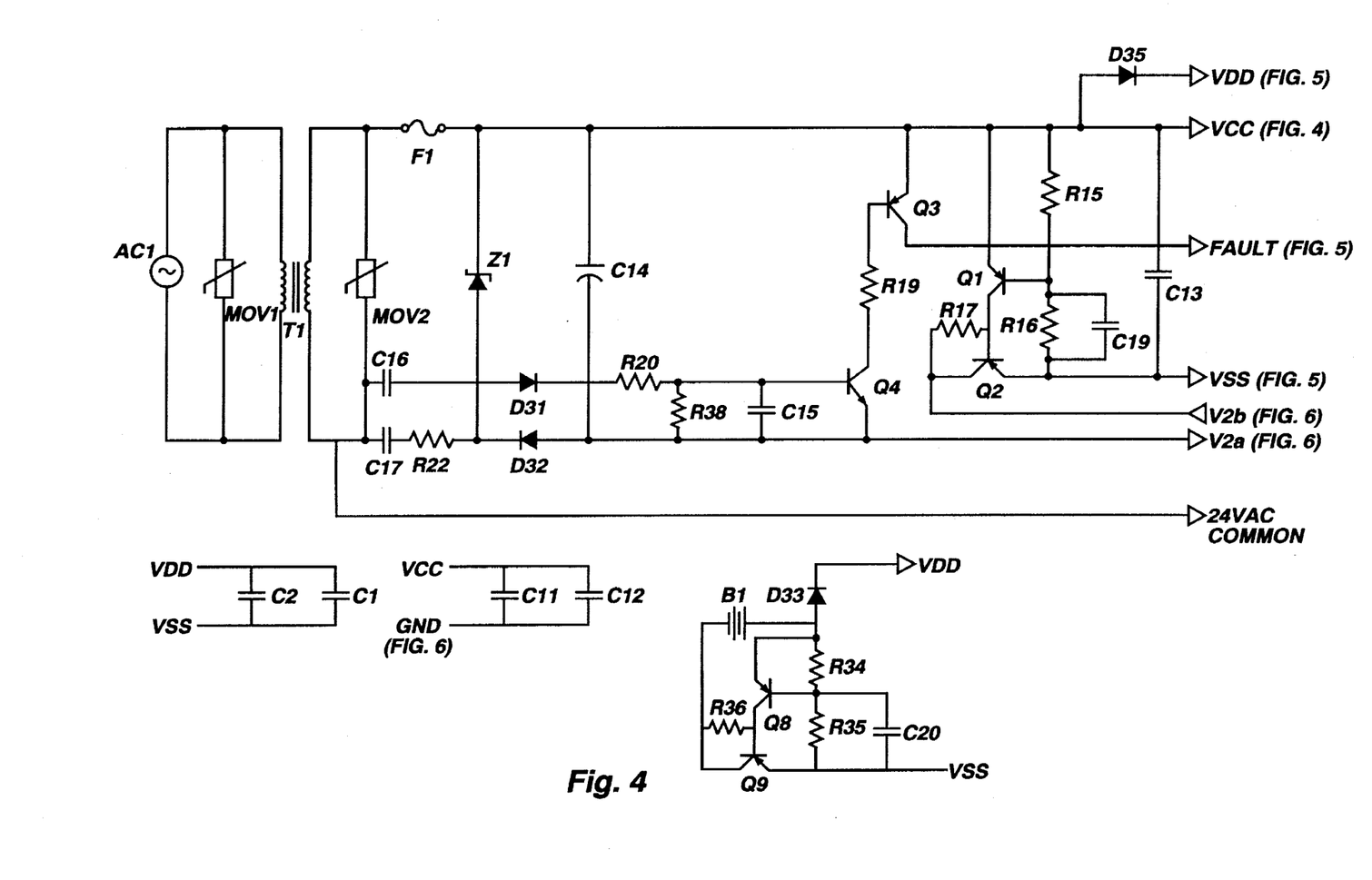
FIG. 4 is an electrical schematic diagram illustrating one presently preferred configuration of the power circuitry of one presently preferred embodiment of the removable control module of the programmable controller apparatus of the present invention.

Reference is next made to FIG. 4, which illustrates in more detail one preferred embodiment of a schematic diagram showing one presently preferred configuration of the power circuitry of the programmable controller 10 of the present invention. Those of ordinary skill in the art will, of course, appreciate that various modifications to the detailed schematic diagram of FIG. 4 may easily be made without departing from the essential characteristics of the invention. Thus, the detailed schematic diagram of FIG. 4 is intended only as an example, and it simply illustrates one presently preferred embodiment of a schematic diagram that is consistent with the invention as claimed herein.

As shown, a metal oxide varistor MOV1 is connected across the AC power supply to protect the programmable controller 10 against voltage spikes due to lightning strikes, for example. The AC voltage is connected to a transformer T1, such as a 120/26 V 60 Hz 750 mA UL approved transformer. This transformer steps the 110 VAC supply down to 24 V AC supply needed in the solenoid valve circuitry at each station. Another metal oxide varistor, MOV2 is connected across the 24 VAC for added protection against voltage spikes. Fuse F1 is connected to the 24 VAC line to protect against power surges. The 24 VAC line is then rectified by diode D32 and regulated to 5 Volts by the resistance capacitance network composed of C17 and R22 and Zener diode Z1. The 5 Volt line is then filtered by capacitor C14 which is connected in parallel with Zener diode Z1.

Capacitors C15 and C16, diode D31, resistors R20, R38 and R19, and transistors Q3 and Q4 perform the fault detecting function of the controller. If there is a fault in the valve of a watering station, when that station is activated, a large amount of current will be drawn from the 24 VAC supply. Because of the large current drain, the 24 VAC voltage will drop to a substantially smaller voltage, with the drop in voltage being proportional to the amount of current drawn. Resistors R20 and R38 detect this voltage drop which is filtered by capacitor C15 and applied to the base of transistor Q4. When the voltage drops to a low level, transistor Q4 is turned on. The collector terminal of Q4 is connected to the base of transistor Q3 through resistor R19. Thus, when Q4 is turned on, it draws current from the base of transistor Q3 causing Q3 to turn on.

Figure 5:
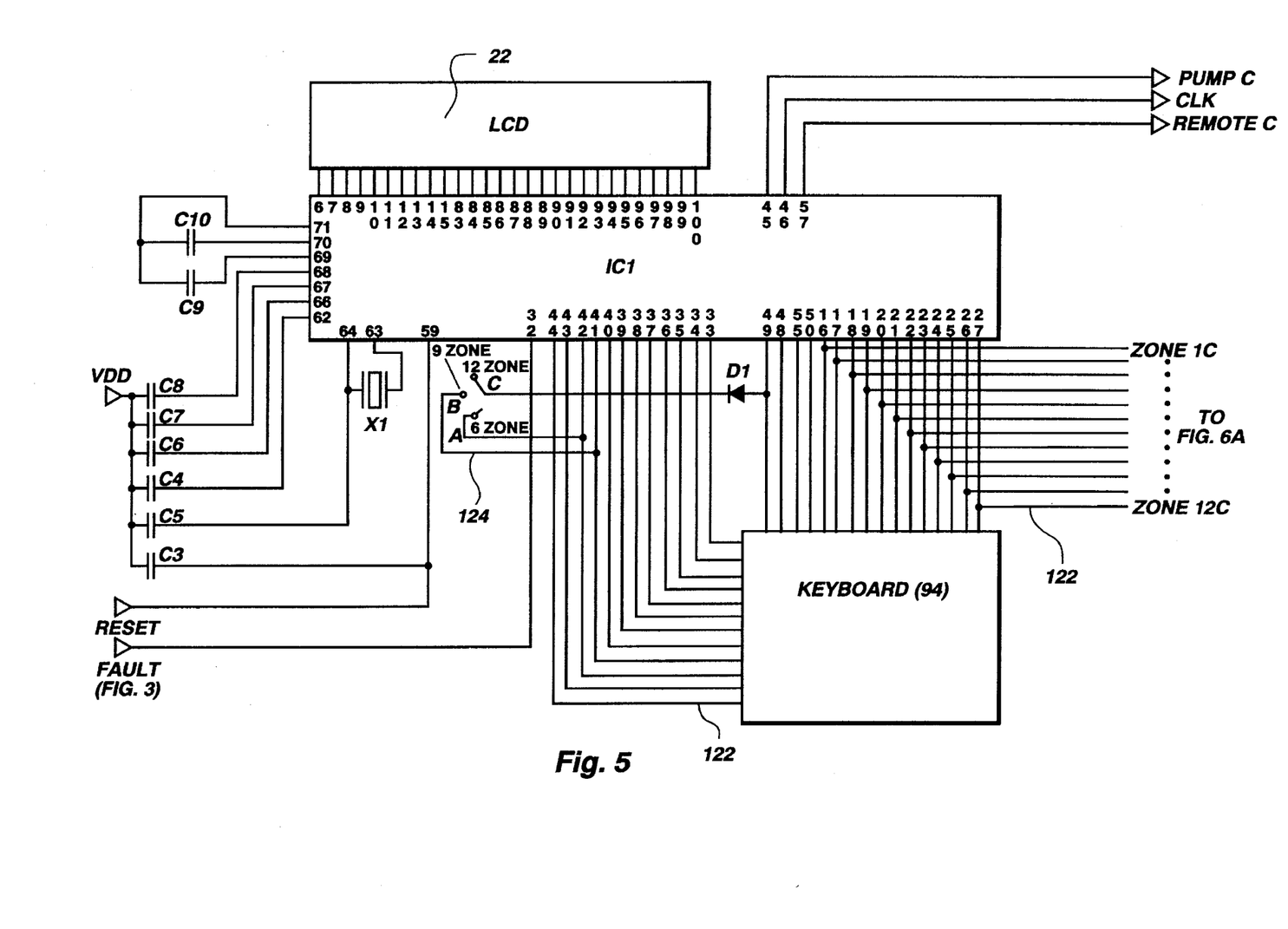
FIG. 5 is an electrical schematic diagram illustrating one presently preferred configuration of the electrical circuitry for the microcontroller, LCD display, keyboard and associated control circuitry of one presently preferred embodiment of the programmable controller of the present invention.

The emitter terminal of Q3 is connected to the regulated 5 V voltage level, and the collector of transistor Q3 is connected to the fault line of the microcontroller, IC1 as shown in FIG. 5. When transistor Q3 is turned on, the fault line is forced to a level of 5 V, indicating that a fault has occurred. The microcontroller, IC1 thereby detects that a fault has occurred, however, the microcontroller does not have enough information to determine which watering station is faulty.

The microcontroller must turn on each individual station one at a time to gather this information. The microcontroller turns on a station, waits approximately .5 seconds, and then monitors the fault line to determine if a fault has occurred. When the microcontroller finds the faulty station, the fault is displayed by LCD display 22, and the faulty station is bypassed in all watering cycles until the faulty circuitry is repaired.

Illustrated in FIG. 5 is one preferred embodiment of a schematic diagram of the presently preferred configuration of the microcontroller, LCD display 22 and keyboard circuitry of the programmable controller 10. Those of ordinary skill in the art will, of course, appreciate that various modifications to the detailed schematic diagram of FIG. 5 may easily be made without departing from the essential characteristics of the invention. Thus, the detailed schematic diagram of FIG. 5 is intended only as an example, and it simply illustrates one presently preferred embodiment of a schematic diagram that is consistent with the invention as claimed herein.

Figure 6A:
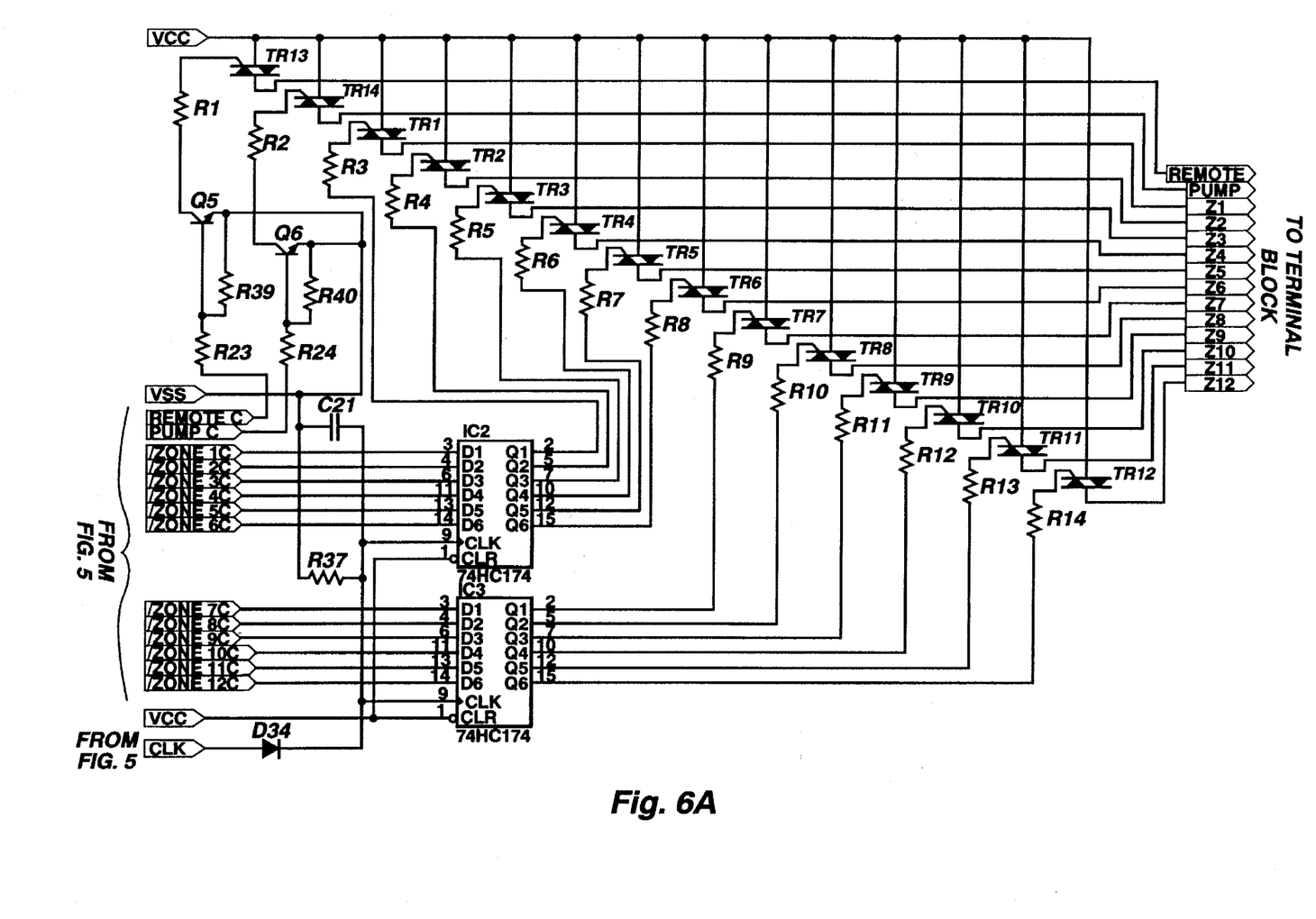
FIGS. 6A & 6B constitute an electrical schematic diagram illustrating one presently preferred configuration of the electrical circuitry showing one presently preferred embodiment of the power terminal driving circuitry of the removable control module of the programmable controller of the present invention.
Figure 6B:
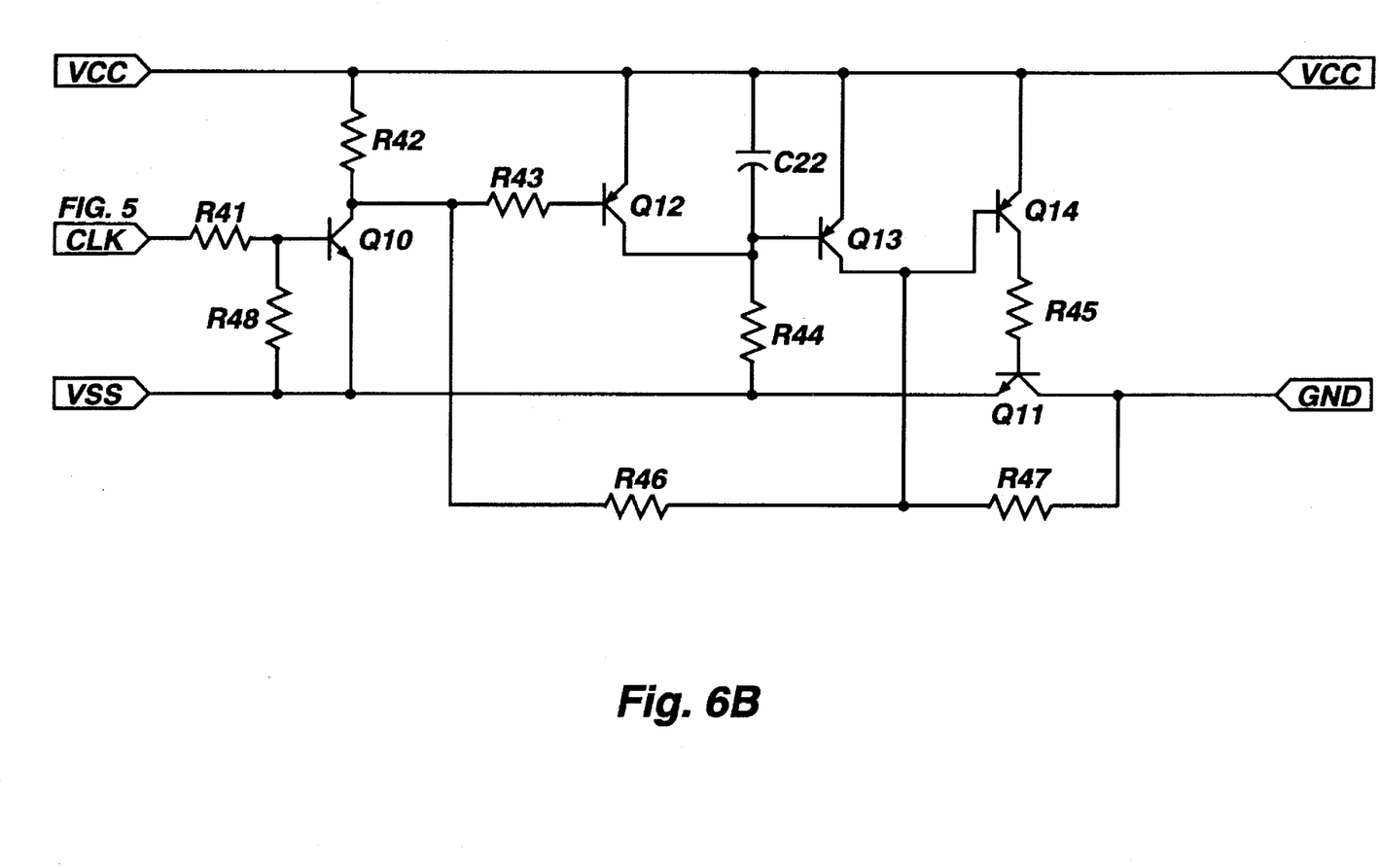

The microcontroller IC1 is any suitable programmable device, such as an SMC6233. Preferably, the microcontroller has a clock input, LCD display controlling circuity, and various control lines. Pins 6 through 15 and 83 through 100 of the microcontroller IC1 connect to and control LCD display 22 in a manner familiar to those skilled in the art. Pins 62, 114, 67, and 110 are power connections to the device, the power line VDD being filtered through capacitors C4, C6, C7, and C8. The device X1 is an oscillator of any suitable type that produces a clock signal to the microcontroller IC1. The microcontroller also produces a series of control and status lines 122 for the keyboard 94. These lines allow the microcontroller to have access to the information programmed by the user through the keyboard 94 consisting of the rotary switch 24, twelve duration slide switches 40, twelve "3" position programming slide switches 64, and dome keys 26-36. Twelve of the control lines (ZONE1C through ZONE12C) are used by the power terminal driving circuitry of FIG. 6 as will be described later. The Reset line is connected directly to the front panel reset push button 38 and enters the microcontroller at pin 5.

Spare soldering pads 125 are placed on the printed circuit board for use by the manufacturer to specify the number of zones the present invention can control. Pin 49 of the microcontroller IC1 is soldered to pad A, B, or C to indicate a six, nine, or twelve station watering system, respectively. Pins 45, 46, and 57 of the microcontroller IC1 provide operational control to at least one pump triac, the clock, and the remote (fault indicator) circuitry shown in FIG. 6. Microcontroller IC1 is programmed in a manner familiar to those skilled in the art with the capacity for controlling every aspect of the present invention, from the control of LCD display 22 to the control of the watering output of a plurality of sprinkling valves. Capacitors C9 and C10 are part of the circuitry needed to drive the LCD display.

FIG. 6 illustrates one preferred embodiment of a schematic diagram of the configuration of the power terminal driving circuitry of removable control module 20 of the present invention. Those of ordinary skill in the art will, of course, appreciate that various modifications to the detailed schematic diagram of FIG. 6 may easily be made without departing from the essential characteristics of the invention, as described. Thus, the detailed schematic diagram of FIG. 6 is intended only as an example, and it simply illustrates one presently preferred embodiment of the power terminal driving circuitry consistent with the description and invention as claimed herein.

As shown, FIG. 6 illustrates the power terminal driving circuitry of one preferred embodiment of the programmable controller 10. ZONE1C-12C, REMOTEC, PUMPC, and CLK are provided by the microcontroller circuitry as described in FIG. 5. ZONE lines are connected to two integrated circuits IC2 and IC3 which may be 74HC174 or other suitable devices. The foregoing integrated circuits provide the function of latching the data on the ZONE lines from the microcontroller. The data indicates which watering station is to be enabled at what time. The data is also latched into the integrated circuits IC2 and IC3 only on the rising edge of the CLK signal, which is controlled by microcontroller IC1. The CLK signal is connected through a pull-down resistor and a filter capacitor to the VSS signal level. When latched, ZONE data becomes a voltage level which enables any one of the twelve station triacs, TR1 to TR12, through resistors R3 through R14. The output of the various triacs is directly fed to terminal block 88 and further introduced to a solenoid valve for each individual station.

The REMOTEC and PUMPC signals, also produced by microcontroller IC1, control the water pump and remote triacs TR14 and TR13 through a transistor switch network composed of transistors Q5 and Q6, and resistors R23, R24, R39 and R40. Under microcontroller IC1 control, the switch network can be placed in either an open or a closed condition enabling or disabling the triacs to the REMOTE terminal and to the PUMP terminal respectively. The REMOTE terminal is used to provide an external indication of a fault condition, while the PUMP terminal is used to turn the master valve on or off.

The microprocessor decides by scanning the position of the sliders and assessing other information such as the day, date, time and pre-programmed information, if and when a particular 24 VAC output should be "on" or "off." When the output should be "on," the microprocessor gives a current to the particular triac control circuitry shown in FIG. 6B through the IC and resistor circuitry, thereby turning "on" the gate of the triac. When the gate is turned "on," it allows power from the transformer to flow to the particular output terminal. In turn, each output terminal is connected to a particular solenoid-valve which when activated opens allowing water to flow to a particular watering area.

From the above description, it will be appreciated that the present invention provides a programmable controller apparatus and method for irrigation systems which provides a manual mode of operation for selectively overriding programming sequences of designated watering stations without influencing the preprogramming sequence of other watering stations. Unlike prior art irrigation controllers, the present invention incorporates an external warning device for signaling faulty watering stations and provides a master valve which is selectively programmable by watering station.

Additionally, the present invention provides a novel combination of electronic programming which interacts with manual programming features to provide greater ease and flexibility in programming the control module, or when making minor program modifications. The watering capability of the present irrigation system can also be easily expanded by removably introducing a control module providing greater watering capability, without requiring the incorporation of additional programmable controllers or separate programming routines. Moreover, the programmable controller is radio compatible for on-site activation of watering stations when servicing or maintaining the irrigation system. Based on the foregoing, the present invention thus provides significant advantages over prior art irrigation controllers now in use.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A programmable controller apparatus for selectively activating a plurality of irrigation valves, the apparatus comprising:
   a housing unit;
   at least one removable control module having memory capacity;
   internal electrical circuitry confined within the housing unit for interfacing remote irrigation valves with the control module;
   a power supply connected to the internal circuitry;
   a rotary switch for selecting input/operational command modes for programming the control module;
   a plurality of buttons for entering data into the memory of the control module;
   a plurality of slide switches for selecting programming schedules and watering durations for a plurality of watering stations;
   a replaceable control template removably positioned over a front facing of the control module, said control template having graphical depictions reproduced thereon for correlating programming interactions between the rotary switch, the plurality of input buttons, and the plurality of slide switches;
   a display for displaying data entered into the control module, wherein said display toggles between a current time clock setting and an active watering cycle;
   activating circuitry for selectively energizing the irrigation valves;
   electronic circuitry for selectively activating at least one master valve and water pump to provide irrigation to one or more selected water valves;
   manual programming means for selectively overriding watering sequences preprogrammed into the memory of the control module;
   at least one external default-signaling means for providing visual warning of faulty irrigation valves;
   means for expanding watering capacity of the programmable controller apparatus; and
   a back-up battery power source for maintaining program integrity of the control module in the event of a power failure.

2. A programmable controller apparatus for selectively activating a plurality of irrigation valves as defined in claim 1 wherein said housing unit is formed of a weather resistant material.

3. A programmable controller apparatus for selectively activating a plurality of irrigation valves as defined in claim 1 wherein said housing unit is formed of a rigid plastic composite material.

4. A programmable controller apparatus for selectively activating a plurality of irrigation valves as defined in claim 1 wherein said housing unit comprises a hingeably attached cover.

5. A programmable controller apparatus for selectively activating a plurality of irrigation valves as defined in claim 4 wherein said housing unit further comprises a latch mechanism and locking means for securing the cover member over said housing unit to prevent water contamination and unauthorized tampering of the control module.

6. A programmable controller apparatus for selectively activating a plurality of irrigation valves as defined in claim 1 wherein said control module is removably connected to the housing unit.

7. A programmable controller apparatus for selectively activating a plurality of irrigation valves as defined in claim 6 wherein said removable control module comprises retaining means for supporting the control module within the housing unit.

8. A programmable controller apparatus for selectively activating a plurality of irrigation valves as defined in claim 6 wherein said removable control module comprises a connector card which interfaces with a complimentary connector means integrally formed on the housing unit for electronically interfacing said control module with the internal circuitry.

9. A programmable controller apparatus for selectively activating a plurality of irrigation valves as defined in claim 1 wherein said replaceable control template comprises an adhesive backing.

10. A programmable controller apparatus for selectively activating a plurality of irrigation valves as defined in claim 1 wherein said replaceable control template may be provided in various languages to assist in programming the control module.

11. A programmable controller apparatus for selectively activating a plurality of irrigation valves as defined in claim 1 wherein said data entry buttons include at least six electronic programming dome keys.

12. A programmable controller apparatus for selectively activating a plurality of irrigation valves as defined in claim 1 wherein said plurality of slide switches comprises water duration slide switches and programming slide switches.

13. A programmable controller apparatus for selectively activating a plurality of irrigation valves as defined in claim 12 wherein said duration slide switches includes multiple watering intervals representative of various increments of time.

14. A programmable controller apparatus for selectively activating a plurality of irrigation valves as defined in claim 12 wherein said duration slide switches include twelve electromechanical switches.

15. A programmable controller apparatus for selectively activating a plurality of irrigation valves as defined in claim 12 wherein said programming switches comprise at least two programming schedules.

16. A programmable controller apparatus for selectively activating a plurality of irrigation valves as defined in claim 1 wherein said display is a liquid crystal display.

* * * * *